(12) United States Patent
Masuda et al.

(10) Patent No.: US 9,217,479 B2
(45) Date of Patent: Dec. 22, 2015

(54) ELECTRIC BRAKE SYSTEM

(75) Inventors: Yui Masuda, Iwata (JP); Toru Takahashi, Iwata (JP)

(73) Assignee: NTN CORPORATION, Osaka (JP)

( * ) Notice: Subject to any disclaimer, the term of this patent is extended or adjusted under 35 U.S.C. 154(b) by 53 days.

(21) Appl. No.: 13/978,450

(22) PCT Filed: Dec. 15, 2011

(86) PCT No.: PCT/JP2011/079004
§ 371 (c)(1),
(2), (4) Date: Aug. 28, 2013

(87) PCT Pub. No.: WO2012/093568
PCT Pub. Date: Jul. 12, 2012

(65) Prior Publication Data
US 2013/0327601 A1    Dec. 12, 2013

(30) Foreign Application Priority Data

Jan. 7, 2011   (JP) ................................ 2011-001596
Aug. 30, 2011   (JP) ................................ 2011-186954

(51) Int. Cl.
*F16D 65/21* (2006.01)
*F16D 55/226* (2006.01)
(Continued)

(52) U.S. Cl.
CPC .............. *F16D 55/226* (2013.01); *F16D 65/18* (2013.01); *F16D 66/00* (2013.01);
(Continued)

(58) Field of Classification Search
CPC ......... F16H 25/22; F16D 65/14; F16D 55/00; F16D 66/00; B60T 13/74

USPC .................................................. 188/156–164
See application file for complete search history.

(56) References Cited

U.S. PATENT DOCUMENTS 4,953,668 A * 9/1990 Severinsson .................. 188/158
5,931,268 A * 8/1999 Kingston et al. .............. 188/162
(Continued)

FOREIGN PATENT DOCUMENTS

JP   2003-014018    1/2003
JP   2003-287063    10/2003
(Continued)

OTHER PUBLICATIONS

International Search Report issued Mar. 27, 2013 in International (PCT) Application No. PCT/JP2011/079004.
(Continued)

*Primary Examiner* — Christopher Schwartz
(74) *Attorney, Agent, or Firm* — Wenderoth, Lind & Ponack, L.L.P.

(57) ABSTRACT

An electric brake system includes a plurality of planetary rollers kept in rolling contact with the radially outer surface of a rotary shaft, a carrier which is restrained from axial movement, an axially movable outer ring member, and a friction pad provided at the axially front end of the outer ring member. The rotation of the rotary shaft is converted to axial movement of the outer ring member, thereby pressing the friction pad with the outer ring member. The brake system further includes a reaction force receiving member provided axially rearwardly of the outer ring member for receiving an axial rearward reaction force applied to the outer ring member when the friction pad is pressed by the outer ring member. A displacement sensor measures the displacement of the reaction force receiving member, thereby detecting the pressing force of the friction pad.

18 Claims, 11 Drawing Sheets

(51) Int. Cl.
*F16D 65/18* (2006.01)
*F16D 66/00* (2006.01)
F16D 121/24 (2012.01)
F16D 125/36 (2012.01)
F16D 125/40 (2012.01)
F16D 125/48 (2012.01)

(52) U.S. Cl.
CPC .... *F16D 2066/003* (2013.01); *F16D 2066/005* (2013.01); *F16D 2121/24* (2013.01); *F16D 2125/36* (2013.01); *F16D 2125/40* (2013.01); *F16D 2125/48* (2013.01)

(56) References Cited

U.S. PATENT DOCUMENTS

| | | | |
|---|---|---|---|
| 6,412,610 B1* | 7/2002 | Drennen et al. | 188/156 |
| 7,565,953 B2* | 7/2009 | Dalton et al. | 188/1.11 R |
| 7,565,954 B2* | 7/2009 | Kawahara et al. | 188/1.11 L |
| 7,721,853 B2* | 5/2010 | Chittka | 188/72.8 |
| 8,579,090 B2* | 11/2013 | Yamasaki | 188/72.8 |
| 2004/0035655 A1* | 2/2004 | Usui | 188/161 |
| 2004/0154877 A1 | 8/2004 | Severinsson | |
| 2006/0169548 A1* | 8/2006 | Corbett et al. | 188/72.8 |
| 2007/0068748 A1* | 3/2007 | Chittka | 188/72.7 |
| 2007/0107531 A1 | 5/2007 | Munz et al. | |
| 2008/0011560 A1 | 1/2008 | Yamaguchi et al. | |
| 2010/0084230 A1* | 4/2010 | Yamasaki et al. | 188/162 |
| 2010/0320043 A1 | 12/2010 | Yamasaki et al. | |
| 2014/0158479 A1* | 6/2014 | Takahashi et al. | 188/72.1 |
| 2014/0262634 A1* | 9/2014 | Yamasaki et al. | 188/72.1 |

FOREIGN PATENT DOCUMENTS

| | | |
|---|---|---|
| JP | 2004-204990 | 7/2004 |
| JP | 2004-529809 | 9/2004 |
| JP | 2006-514306 | 4/2006 |
| JP | 2008-008476 | 1/2008 |
| JP | 2009-197863 | 9/2009 |
| JP | 2010-270788 | 12/2010 |
| WO | WO 2010/041588 * | 4/2010 |

OTHER PUBLICATIONS

Written Opinion of the International Searching Authority issued Mar. 27, 2013 in International (PCT) Application No. PCT/JP2011/079004 (with partial English translation).

* cited by examiner

ELECTRIC BRAKE SYSTEM

TECHNICAL FIELD

This invention relates to an electric brake system used e.g. in a vehicle.

BACKGROUND ART

Older vehicle brake systems are mostly hydraulic brake systems, in which the friction pads are driven by hydraulic cylinders. But with the recent introduction of sophisticated brake control arrangements, including anti-lock brake systems (ABS's), electric brake systems that use no hydraulics are gathering attention.

Electric brake systems include a linear motion mechanism in which the rotary motion of a rotary shaft driven by an electric motor is converted to a linear motion of a linear motion member, thereby pressing a friction pad against the brake disk with the linear motion member. Many of such electric brake systems include a sensor for detecting the pressing force with which the friction pad is pressed against the brake disk in order to control the braking force to a desired value.

Each of JP Patent Publication 2003-287063A, JP Patent Publication 2003-014018A, and JP Patent Publication 2004-204990A discloses an electric brake system including a sensor for detecting the pressing force of the friction pad.

The electric brake system disclosed in JP Patent Publication 2003-287063A includes a caliper body having opposed pieces facing each other on opposite sides of the brake disk and connected together by a bridge, and a linear motion mechanism mounted in the caliper body. One of the friction pads is pressed against the brake disk by a linear motion member of the linear motion mechanism. A strain sensor is mounted in the caliper body at its portion where the bridge is joined to one of the opposed pieces to detect the pressing force of the friction pad.

The electric brake system disclosed in JP Patent Publication 2003-014018A also includes a caliper body having opposed pieces facing each other on opposite sides of the brake disk and connected together by a bridge, and a linear motion mechanism mounted in the caliper body. A pair of electrodes are embedded in the linear motion member of the linear motion mechanism. By measuring the electrical resistance between the electrodes, which changes with strain, it is possible to detect the pressing force of the friction pad.

The electric brake system disclosed in JP Patent Publication 2004-204990A also includes a caliper body having opposed pieces facing each other on opposite sides of the brake disk and connected together by a bridge, and a linear motion mechanism mounted in the caliper body. A hydraulic pressure chamber is defined in the linear motion member of the linear motion mechanism. A hydraulic pressure sensor is used to measure the pressure in the hydraulic pressure chamber, which changes with strain, thereby detecting the pressing force of the friction pad.

Generally speaking, the area surrounding the friction pads is heated to high temperature due to frictional heat generated between the friction pads and the brake disk.

In this regard, with the electric brake system disclosed in JP Patent Publication 2003-287063A, since the strain sensor for detecting the pressing force of the friction pad is provided in the caliper body at its portion where the bridge is joined to one of the opposed pieces, the strain sensor tends to be heated to high temperature. Thus, it is impossible to provide a circuit for processing the sensor signal sufficiently close to the strain sensor. Thus, the sensor signal tends to pick up noise. Also, when the caliper body is heated to high temperature, the caliper body tends to suffer from heat strain due to uneven temperature distribution. Heat strain of the caliper body makes it difficult to measure only the strain due to the pressing force of the friction pad with high accuracy.

In the electric brake system disclosed in JP Patent Publication 2003-014018A, too, since the electrodes for detecting the pressing force of the friction pad are provided in the linear motion member of the linear motion mechanism for pressing the friction pads, the electrodes tend to be heated to high temperature, which makes it impossible to position the signal processing circuit sufficiently close to the electrodes. This increases the possibility of the detection signal picking up noise. Also, since the linear motion member, in which the electrodes are embedded, moves, it is necessary to movably arrange the cables leading to the electrodes, which pushes up cost.

With the electric brake system disclosed in JP Patent Publication 2004-204990A, if hydraulic fluid in the hydraulic pressure chamber leaks and air mixes into the hydraulic pressure chamber instead, the output of the hydraulic pressure sensor will not change corresponding to the pressing force of the friction pad. Thus this system has a problem in long-term reliability. To improve the long-term reliability of this system, it is necessary to improve the liquid tightness of the hydraulic pressure chamber. But this solution incurs additional cost.

SUMMARY OF THE INVENTION

An object of the present invention is to provide an electric brake system including a sensor for detecting the pressing force of the friction pad which is less likely to be affected by frictional heat generated between the friction pad and the brake disk.

In order to achieve the above object, the present invention provides an electric brake system comprising a rotary shaft driven by an electric motor, a linear motion member, a linear motion mechanism for converting a rotary motion of the rotary shaft to a linear motion of the linear motion member, a caliper body formed with a receiving hole in which the linear motion member is axially slidably received, and a friction pad arranged at the axial front end of the linear motion member, wherein the linear motion member is configured to press the friction pad against a brake disk, wherein the electric brake system further comprises a reaction force receiving member provided axially rearwardly of the linear motion member for receiving an axially rearward reaction force applied to the linear motion member when the friction pad is pressed by the linear motion member, and a displacement sensor for measuring a displacement of the reaction force receiving member.

With this arrangement, since the displacement sensor is provided, not in or on the linear motion member of the linear motion mechanism, but at a portion where the reaction force applied to the linear motion member is received, the distance between the friction pad and the displacement sensor is longer. This reduces the influence of frictional heat generated between the friction pad and the brake disk, thus making it possible to detect the pressing force of the friction pad with high accuracy.

The brake system may further include a snap ring fitted in a circumferential groove formed in the inner wall of the receiving hole at a portion of the inner wall located axially rearwardly of the area of the inner wall where the linear motion member slides such that the snap ring restrains axially rearward movement of the reaction force receiving member. In this case, the axially rearward movement of the reaction force receiving member may be restrained directly by the snap ring. But preferably, an elastic member is disposed between the snap ring and the reaction force receiving member so as to restrain movement of the reaction force receiving member through the elastic member. With this arrangement, when the reaction force receiving member receives the axially rearward reaction force applied to the linear motion member, the reaction force receiving member is displaced not only due to strain of the reaction force receiving member itself, but also due to the deformation of the elastic member. Thus, by providing the elastic member, it is possible to displace the reaction force receiving member more markedly than when the reaction force receiving member is directly supported by the snap ring. This in turn makes it possible to detect the pressing force of the friction pad with higher resolution.

The elastic member may be a coil spring, but is preferably an annular metal member having an L-shaped section and kept in abutment with the reaction force receiving member at its portion located radially inwardly of the radially inner periphery of the snap ring. Such an L-shaped metal elastic member can support high axial loads even though its axial length is small. Thus by using such an elastic member, it is possible to minimize the axial length of the electric brake system and thus its installation space.

When the reaction force applied to the linear motion member is received by the reaction force receiving member with its axial movement restrained by the snap ring, the reaction force receiving member is more markedly deformed at its radially inner portion than at its radially outer portion. Thus, by placing the displacement sensor such that the sensor can measure the axial displacement of, not the radially outer portion of the reaction force receiving member, but the radially innermost portion of the reaction force receiving member, it is possible to detect the pressing force of the friction pad with higher accuracy. The displacement sensor may be mounted on a radially extending strip plate member, but is preferably mounted on a ring-shaped sensor mounting plate which is fixedly positioned axially rearwardly of the reaction force receiving member and through which the rotary shaft extends, because such a ring-shaped sensor mounting plate is higher in rigidity and thus can minimize vibration of the displacement sensor, which in turn stabilizes detection accuracy of the displacement sensor.

The displacement sensor may be an optical sensor. In this case, the space between the displacement sensor and the reaction force receiving member is preferably covered with a soft member which can be deformed as the reaction force receiving member is displaced. Such a soft member keeps dust, lubricating oil, etc. away from the sensing area of the optical sensor, allowing the displacement sensor to maintain high detection accuracy for a prolonged period of time.

The displacement sensor may be a magnetic sensor, an eddy current sensor or an electrical capacitance sensor. These sensors are less likely to be affected by dust, lubricating oil, etc, and thus can maintain high sensing reliability at a low cost.

The brake system may further include at least two permanent magnets magnetized in a direction perpendicular to the axial direction, and fixed to the reaction force receiving member such that the north pole and the south pole of the respective permanent magnets are located axially adjacent to each other, with a magnetic sensor as the displacement sensor located in the vicinity of the boundary between the axially adjacent north pole and south pole. With this arrangement, the output signal of the displacement sensor changes sharply only when the reaction force receiving member is displaced in the axial direction, and scarcely changes for displacement of the reaction force receiving member in a direction other than the axial direction. Thus, it is possible to detect axial loads applied to the actuator with high accuracy in a stable manner, practically without the influence of external vibrations.

The linear motion mechanism may comprise a plurality of planetary rollers kept in rolling contact with a radially outer surface of the rotary shaft, a carrier retaining the planetary rollers such that the planetary rollers can rotate about the axes of the respective planetary rollers and can also revolve around the rotary shaft, the carrier being restrained from axial movement, and an outer ring member surrounding the planetary rollers as the linear motion member, wherein the outer ring member has a helical rib formed on the radially inner surface of the outer ring member, and engaged in helical grooves or circumferential grooves formed in the radially outer surfaces of the respective planetary rollers. In this arrangement, when the outer ring member as the linear motion member presses the friction pad axially forwardly, the axially rearward reaction force that acts on the outer ring member is transmitted to the reaction force receiving member through the planetary rollers and the carrier, and received by the reaction force receiving member.

In the electric brake system according to this invention, since the displacement sensor is provided, not in or on the linear motion member of the linear motion mechanism, but at a portion where the reaction force applied to the linear motion member is received, the distance between the friction pad and the displacement sensor is longer. Thus, the displacement sensor and its surrounding area are less likely to be heated to high temperature, which makes it possible to detect the pressing force of the friction pad with high accuracy.

DETAILED DESCRIPTION OF THE INVENTION

Figure 1:
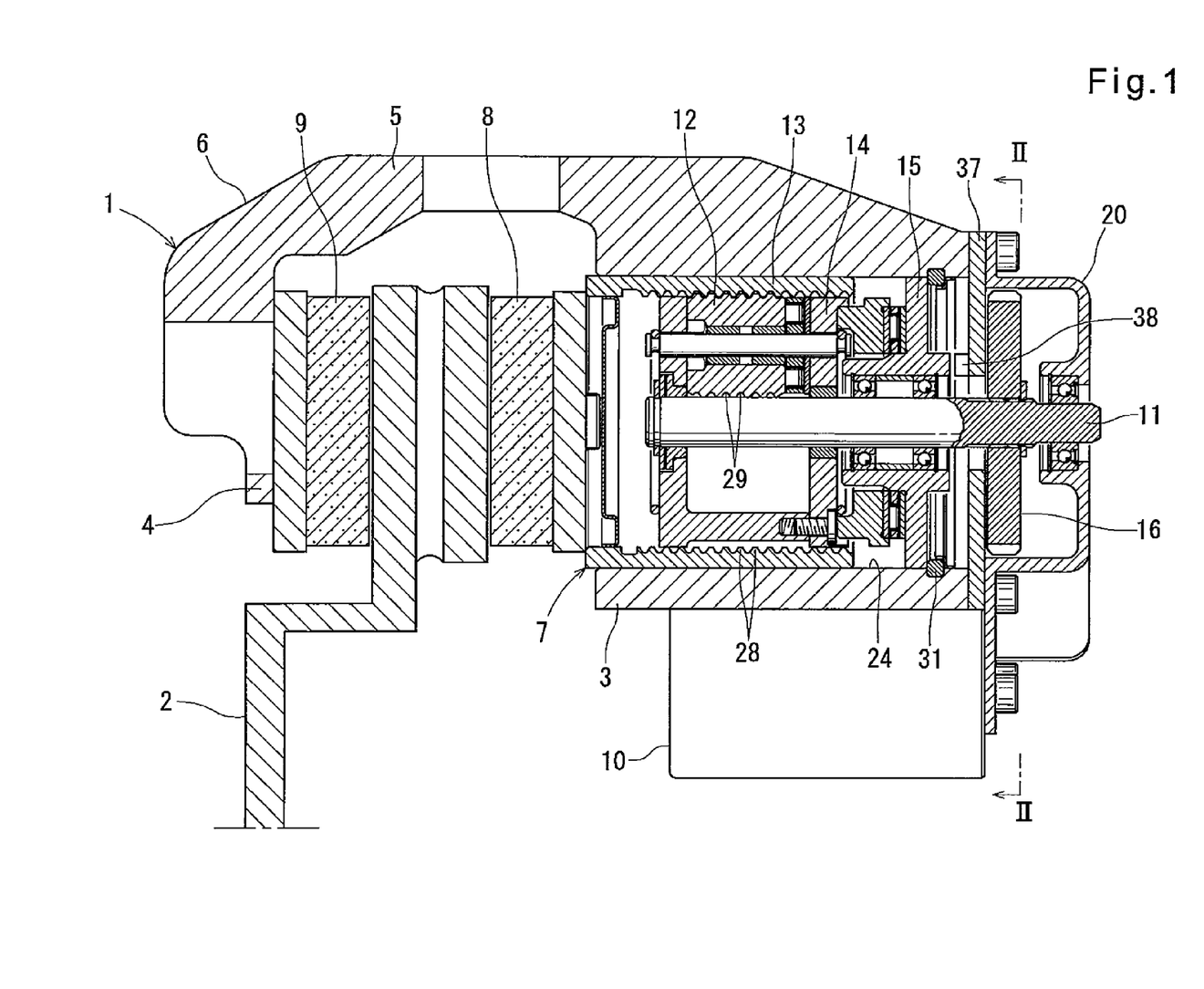
FIG. 1 is a sectional view of an electric brake system embodying the present invention.

FIG. 1 shows an electric brake system 1 embodying the present invention. This electric brake system 1 includes a caliper body 6 having opposed pieces 3 and 4 facing each other on the opposite sides of a brake disk 2 rotatable together with a wheel, and connected together by a bridge 5, an electric linear motion actuator 7 mounted in the opposed piece 3, and a pair of right and left friction pads 8 and 9.

The friction pad 8 is disposed between the opposed piece 3 and the brake disk 2 and is supported by pad pins (not shown) mounted to the caliper body 6 so as to be movable in the axial direction of the brake disk 2. The other friction pad 9 is mounted to the other opposed piece 4, which is provided on the other side of the disk 2. The caliper body 6 is supported by slide pins P (see FIG. 2) so as to be slidable in the axial direction of the brake disk 2.

As shown in FIG. 1, the electric linear motion actuator 7 includes a rotary shaft 11 driven by an electric motor 10, a plurality of planetary rollers 12, an outer ring member 13 surrounding the planetary rollers 12, a carrier 14 supporting the planetary rollers 12, and a reaction force receiving member 15 provided axially rearwardly of the outer ring member 13.

Figure 2:
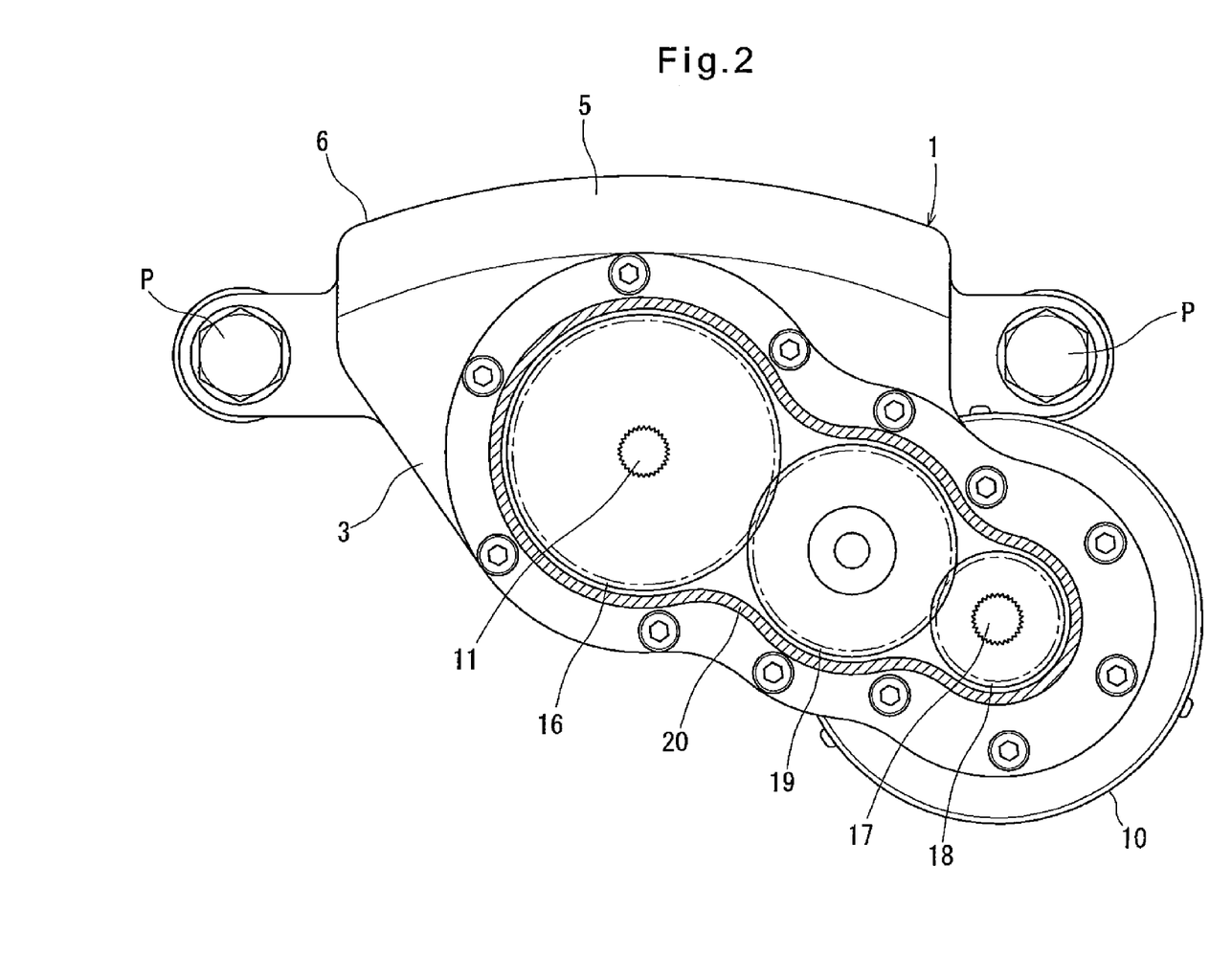
FIG. 2 is a sectional view taken along line II-II of FIG. 1.

The rotary shaft 11 and the electric motor 10 are arranged parallel to each other. As shown in FIG. 2, the rotary shaft 11 has a gear 16 fixed thereto and meshing with a gear 18 fixed to the output shaft 17 of the electric motor 10 through an intermediate gear 19. The rotation of the output shaft 17 of the electric motor 10 is thus transmitted to the rotary shaft 11 through the gear 18, the intermediate gear 19 and then the gear 16. As shown in FIG. 1, the gear 16, intermediate gear 19 and gear 18 are covered by a lid 20 mounted to the opposed piece 3.

Figure 3:
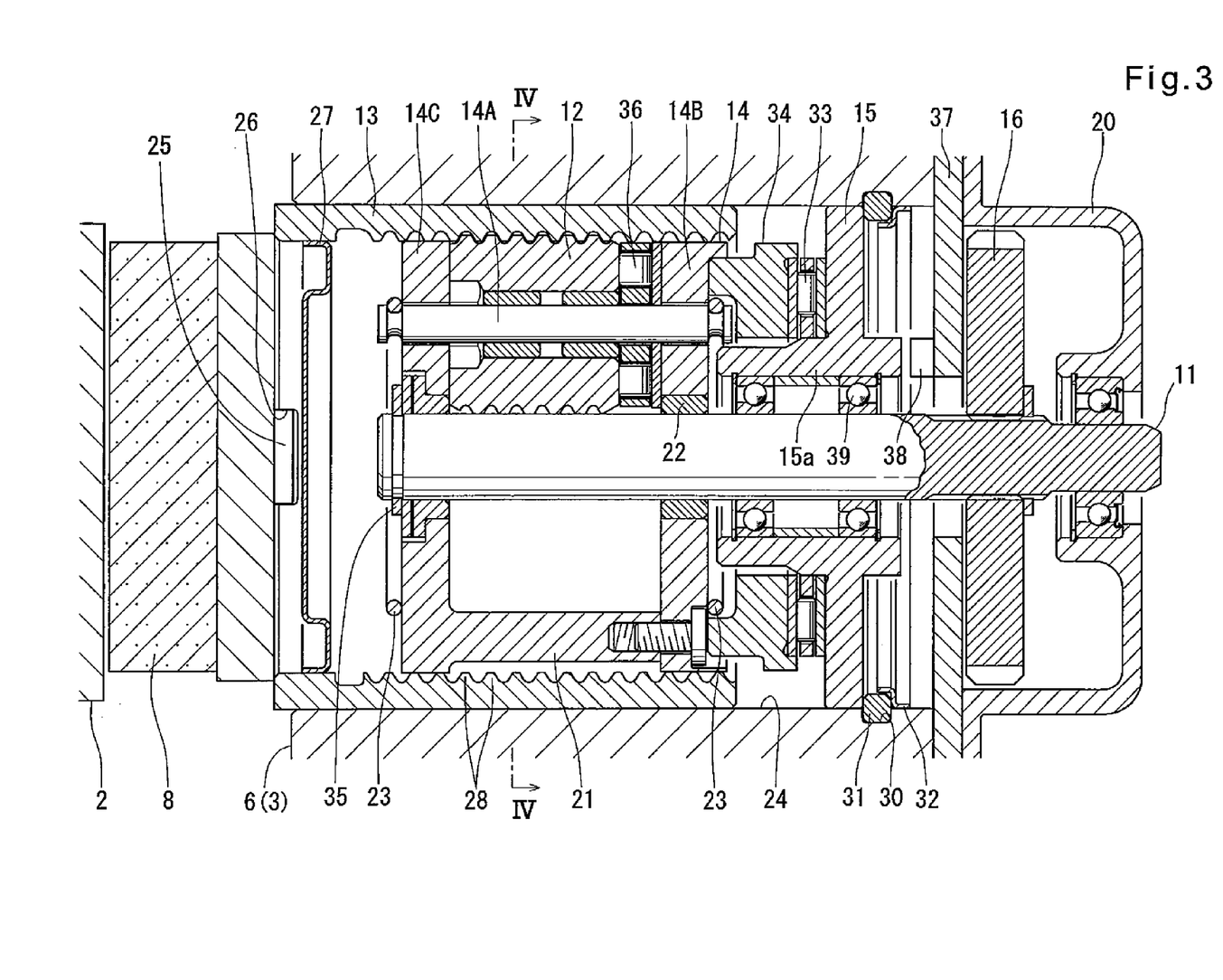
FIG. 3 is an enlarged sectional view of a portion of FIG. 1 where there is an electric linear motion actuator.
Figure 4:
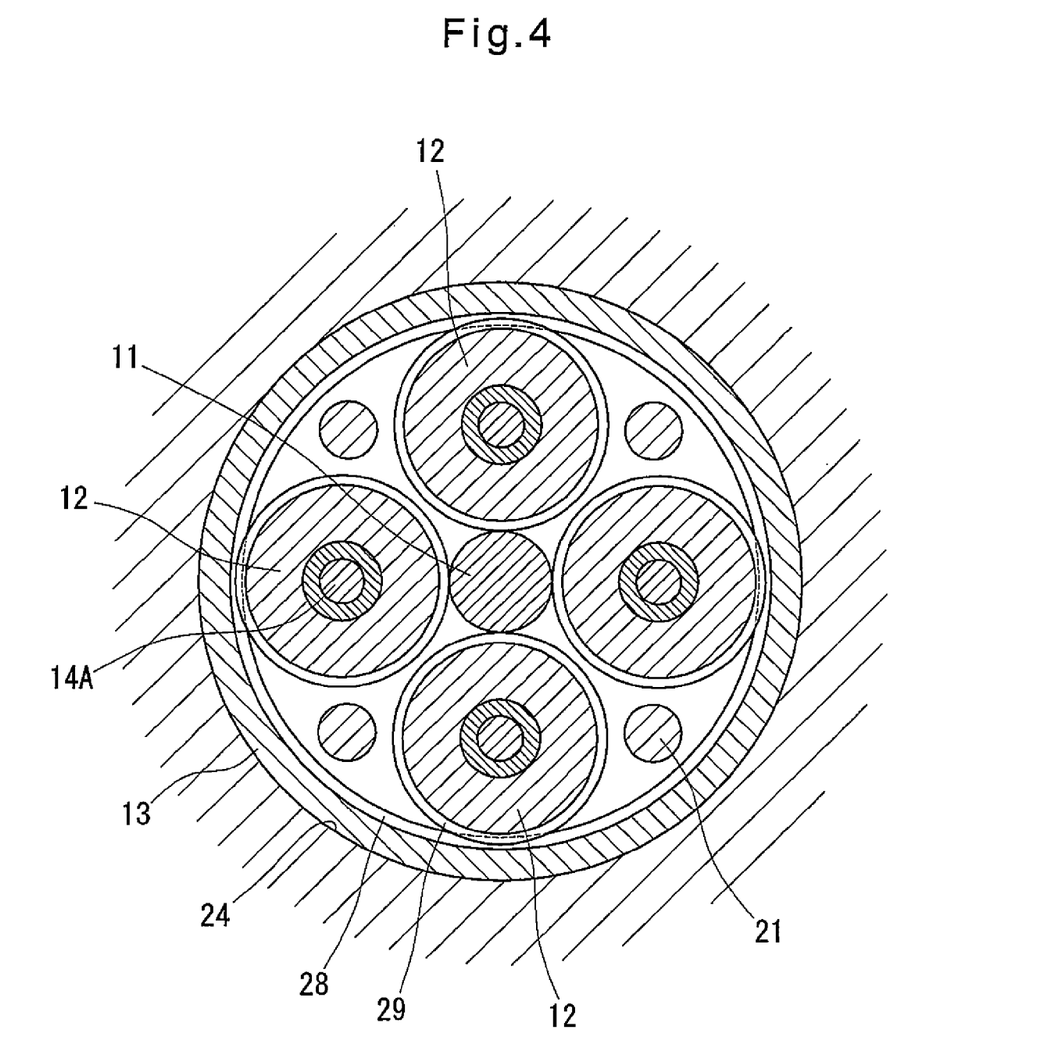
FIG. 4 is a sectional view taken along line IV-IV of FIG. 3.

As shown in FIG. 3, the planetary rollers 12 are mounted between the radially inner surface of the outer ring member 13 and the radially outer surface of the rotary shaft 11. The planetary rollers 12 are in rolling contact with the radially outer surface of the rotary shaft 11 such that the planetary rollers 12 rotate when the rotary shaft 11 rotates due to the friction between the respective planetary rollers 12 and the rotary shaft 11. As shown in FIG. 4, the planetary rollers 12 are circumferentially equidistantly spaced apart from each other.

As shown in FIG. 3, the planetary rollers 12 are supported by the carrier 14 so as to be rotatable about their respective axes and also around the rotary shaft 11. The carrier 14 includes carrier pins 14A rotatably supporting the respective planetary rollers 12, an annular carrier plate 14C, retaining the axial front ends of the carrier pins 14A so as to be circumferentially equidistantly spaced apart from each other, and an annular carrier body 14B retaining the axial rear ends of the carrier pins 14A so as to be circumferentially equidistantly spaced apart from each other. The carrier plate 14C and the carrier body 14B are axially opposed to each other with the planetary rollers 12 disposed therebetween, and are coupled together by means of coupling rods 21 extending between the respective circumferentially adjacent pairs of planetary rollers 12. The carrier body 14B is supported on the rotary shaft 11 through a slide bearing 22 so as to be rotatable relative to the rotary shaft 11.

Two radial compression ring springs 23 are wrapped around the circumferentially spaced apart carrier pins 14A, thereby radially inwardly biasing the carrier pins 14A. Under the biasing force of the radial compression ring springs 23, the radially outer surfaces of the planetary rollers 12 are pressed against the radially outer surface of the rotary shaft 11. The ring springs 23 thus prevent slippage between the rotary shaft 11 and the planetary rollers 12. In order to distribute the biasing force of the radial compression ring springs 23 over the entire axial length of each planetary roller 12, the two radial compression ring springs 23 are respectively provided at both ends of the carrier pins 14A.

The outer ring member 13 is received in a receiving hole 24 formed in the opposed piece 3 of the caliper body 6 so as to be axially slidable in the receiving hole 24. The friction pad 8 is located at the axial front end of the outer ring member 13, and is formed with an engaging protrusion 25 on the back surface thereof. The engaging protrusion 25 is engaged in engaging recesses 26 formed in the axial front end of the outer ring member 13, thus rotationally fixing the outer ring member 13. Thus, the outer ring member 13 is rotationally fixed but axially slidable relative to the caliper body 6.

The outer ring member 13 has an axial front opening closed by a seal member 27. The seal member 27 is formed by pressing a metal sheet, and fixed in position by being inserted into the outer ring member 13 with an interference fit.

Figure 12A:
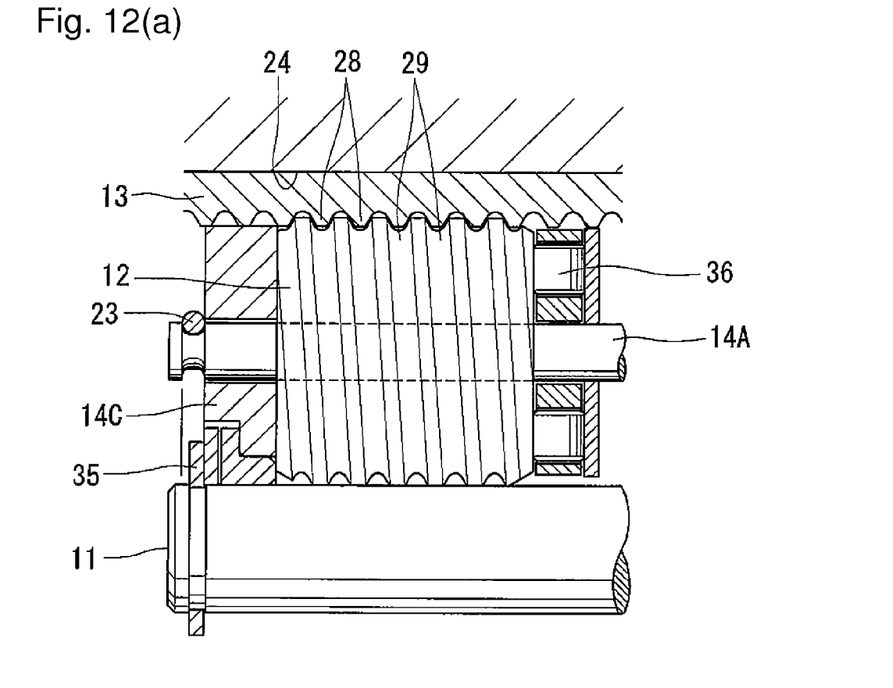
FIG. 12(a) is an enlarged sectional view of a portion of FIG. 3 where there is a planetary roller.
Figure 12B:
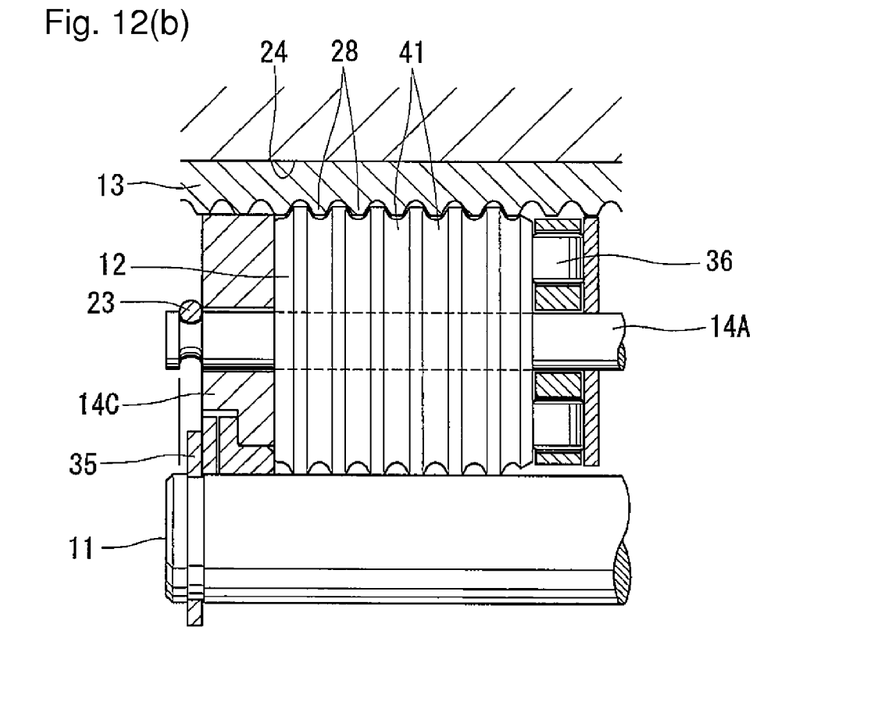
FIG. 12(b) is an enlarged sectional view of a planetary roller which differs from the planetary roller shown in FIG. 12(a) in that circumferential grooves are formed instead of a helical groove.

A helical rib 28 is formed on the radially inner surface of the outer ring member 13 which is engaged in a helical groove 29 formed in the radially outer surface of each planetary roller 12. The helical rib 28 has a lead angle different from the lead angle of the helical grooves 29 such that when the planetary rollers 12 rotate, the outer ring member 13 is moved axially with the helical rib 28 guided by the helical grooves 29. Instead of the helical groove 29 of this embodiment, which is shown in FIG. 12(a), a plurality of circumferential grooves 41, i.e. grooves having a lead angle of zero degrees, may be formed on the radially outer surface of each planetary roller 12 as shown in FIG. 12(b). With this arrangement too, when the planetary rollers 12 rotate, the outer ring member 13 is moved axially with the helical rib 28 guided by the circumferential grooves 41.

A circumferential groove 30 is formed in the inner wall of the receiving hole 24 at its portion axially rearwardly of the portion of the inner wall of the hole 24 along which the outer ring member 13 slides. A snap ring 31 is fitted in the circumferential groove 30. The snap ring 31 is formed by assembling together a plurality of circular arc-shaped split members. An annular retainer 32 prevents radial movement of the snap ring 31, thus retaining the snap ring 31 in the circumferential groove 30.

The reaction force receiving member 15 is a ring-shaped member through which the rotary shaft 11 extends. The snap ring 31 engages the outer edge of the reaction force receiving member 15, thus restraining axially rearward movement of the reaction force receiving member 15. The reaction force receiving member 15 in turn supports the carrier body 14B through a thrust bearing 33 and a spacer 34, thereby restraining axially rearward movement of the carrier 14. The thrust bearing 33, which is mounted between the reaction force receiving member 15 and the carrier 14, prevents the rotation of the carrier 14 from being transmitted to the reaction force receiving member 15.

A snap ring 35 is fitted on the rotary shaft 11 at its axially front end to restrain axially forward movement of the carrier 14. Thus, the carrier 14 can move neither axially forwardly nor axially rearwardly. The planetary rollers 12, which are carried by the carrier 14, can similarly move neither axially forwardly nor axially rearwardly.

Thrust bearings 36 are mounted between the respective planetary rollers 12 and the carrier body 14B. The thrust bearings 36 prevent the rotation of the planetary rollers 12 about their respective axes from being transmitted to the carrier body 14B while the outer ring member 13 is pressing the friction pad 8. But the axially rearward reaction force transmitted from the outer ring member 13 to the planetary rollers 12 while the outer ring member 13 is pressing the friction pad 8 is transmitted to the carrier body 14B through the thrust bearings 36. The reaction force transmitted to the carrier 14 is then transmitted to the reaction force receiving member 15 through the spacer 34 and the thrust bearing 33, and received by the reaction force receiving member 15.

A ring-shaped sensor mounting plate 37 through which the rotary shaft 11 extends is fixedly positioned axially rearwardly of the reaction force receiving member 15. The sensor mounting plate 37 is fixed in this position by e.g. being sandwiched between the opposed piece 3 and the lid 20. A displacement sensor 38 is mounted on the sensor mounting plate 37 such that the sensor 38 can measure axial displacement of the radially innermost portion 15*a* of the reaction force receiving member 15. The displacement sensor 38 may be an optical sensor, a magnetic sensor, an eddy current sensor, an electrical capacitance sensor, etc. The radially innermost portion 15*a* of the reaction force receiving member 15 is cylindrical in shape and rotatably supports the rotary shaft 11 through rolling bearings 39 fitted in the cylindrical radially innermost portion 15*a*.

Now the operation of the electric brake system 1 is described.

When the electric motor 10 is activated, the rotary shaft 11 is rotated, so that the planetary rollers 12 rotate about the respective carrier pins 14A while revolving around the rotary shaft 11. This causes the outer ring member 13 and the planetary rollers 12 to axially move relative to each other because the helical rib 28 is engaged in the helical grooves 29. But actually, since the carrier 14 and thus the planetary rollers 12 are restrained from axial movement, only the outer ring member 13 is axially moved with the planetary rollers 12 not moving axially. Thus, the electric brake system 1 generates a braking force by converting the rotation of the rotary shaft 11 produced by the electric motor 10 to axial movement of the outer ring member 13, thereby pressing the friction pad 8 against the brake disk 2 with the outer ring member 13.

When the outer ring member 13 presses the friction pad 8, an axially rearward reaction force acts on the outer ring member 13. This reaction force is transmitted to the reaction force receiving member 15 through the planetary rollers 12, the thrust bearings 36, the spacer 34 and the thrust bearing 33, and received by the reaction force receiving member 15. The reaction force causes axial deformation of the reaction force receiving member 15. The displacement sensor 38 measures the axial displacement of the reaction force receiving member 15 due to its axial deformation. The axial displacement of the member 15 corresponds to the pressing force with which the friction pad 8 is pressed against the brake disk. Thus, it is possible to calculate the braking force generated by the electric brake system 1 based on the output signal of the displacement sensor 38. This in turn makes it possible to control the braking force of the electric brake system 1 using the output signal of the displacement sensor 38.

When the friction pad 8 is pressed against the brake disk 2, frictional heat is generated between the friction pad 8 and the brake disk 2. The friction pad 8 and its surrounding area are heated to high temperature by such frictional heat. Thus, if a sensor for detecting the pressing force of the friction pad 8 is provided on or in the bridge 5 of the caliper body 6 or on or in the linear motion member (i.e. the outer ring member 13) of the electric linear motion actuator 7, it is impossible to provide a circuit for processing the sensor signal sufficiently close to the (strain) sensor because the sensor is heated to high temperature. This results in increased noise in the sensor signal.

With the arrangement of the present invention, since the displacement sensor 38 for detecting the pressing force of the friction pad 8 is provided, not in or on the linear motion member (outer ring member 13) of the electric linear motion actuator 7, but at a portion for receiving a reaction force applied to the linear motion member (i.e. near the reaction force receiving member 15). The displacement sensor 38 is thus sufficiently spaced apart from the friction pad 8, so that the sensor 38 and its surrounding area are less likely to be heated to high temperature. This makes it possible to detect the pressing force of the friction pad 8 with high accuracy.

With this electric brake system 1, since the thrust bearing 33 prevents transmission of rotation of the carrier 14 to the reaction force receiving member 15, while allowing only transmission of thrust loads to the reaction force receiving member 15, the reaction force receiving member 15 is displaced in a stable manner. This makes it possible to detect the pressing force of the friction pad 8 with high accuracy.

When the reaction force applied to the outer ring member 13 is received by the reaction force receiving member 15, the reaction force receiving member 15 is more markedly deformed at its radially inner portion than at its radially outer portion. Thus, by placing the displacement sensor 38 such that the sensor 38 can measure the axial displacement of, not the radially outer portion of the reaction force receiving member 15, but the radially innermost portion 15*a* of the reaction force receiving member 15, as shown in the above embodiment, it is possible to detect the pressing force of the friction pad 8 with higher accuracy. The displacement sensor 38 may be mounted on a radially extending strip plate member, but is preferably mounted on the ring-shaped sensor mounting plate 37 as shown in the embodiment, because the ring-shaped sensor mounting plate 37 is higher in rigidity and thus can minimize vibration of the displacement sensor 38, which stabilizes detection accuracy of the displacement sensor 38.

If an optical sensor is used as the displacement sensor 38, the space between the displacement sensor 38 and the reaction force receiving member 15 is preferably covered with a soft member (not shown) which can be deformed as the reaction force receiving member 15 is displaced. Such a soft member keeps dust, lubricating oil, etc. away from the sensing area of the optical sensor, allowing the displacement sensor 38 to maintain high detection accuracy for a prolonged period of time.

Figure 5:
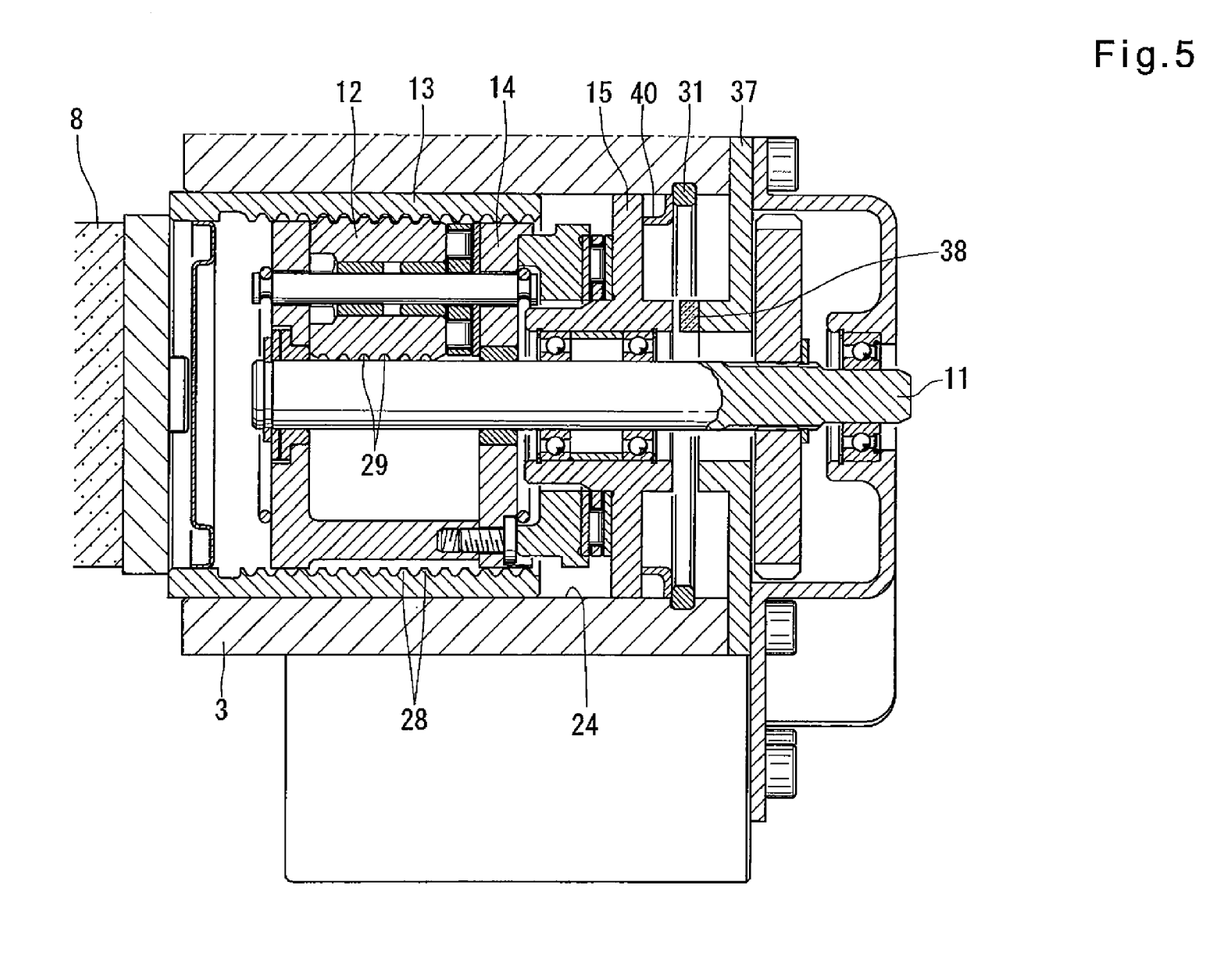
FIG. 5 is a sectional view of a modification of the electric brake system of FIG. 1.

In the embodiment, the snap ring 31 directly restrains movement of the reaction force receiving member 15. But instead, as shown in FIG. 5, an elastic member 40 may be placed between the snap ring 31 and the reaction force receiving member 15 so that the snap ring 31 indirectly restrains movement of the reaction force receiving member 15 through the elastic member 40. With the latter arrangement, when the reaction force receiving member 15 receives the axially rearward reaction force applied to the outer ring member 13, the reaction force receiving member 15 is displaced not only due to strain of the reaction force receiving member 15 itself, but also due to the deformation of the elastic member 40. Thus, by providing the elastic member 40, it is possible to displace the reaction force receiving member 15 more markedly than when the reaction force receiving member 15 is directly supported by the snap ring 31. This in turn makes it possible to detect the pressing force of the friction pad 8 with higher resolution.

The elastic member 40 may be a coil spring, but is preferably, as shown, an annular metal member having an L-shaped section and kept in abutment with the reaction force receiving member 15 at its portion located radially inwardly of the radially inner periphery of the snap ring 31. Such an L-shaped metal elastic member can support high axial loads even though its axial length is small. Thus by using such an elastic member, it is possible to minimize the axial length of the electric brake system and thus its installation space.

In the above embodiment, as the linear motion mechanism for converting the rotary motion of the rotary shaft 11 to the linear motion of the linear motion member, a planetary roller mechanism is used, including a plurality of planetary rollers 12 which are in rolling contact with the radially outer surface of the rotary shaft 11, a carrier 14 retaining the planetary rollers 12 so as to be rotatable about their own axes and revolve around the rotary shaft, the carrier 14 being restrained from axial movement, and an outer ring member 13 surrounding the planetary rollers 12, as the linear motion member, wherein a helical rib 28 is formed on the radially inner surface of the outer ring member 13 which is engaged in helical grooves 29 or circumferential grooves 41 formed in the radially outer surfaces of the planetary rollers 12. But the present invention is applicable to an electric brake system using a different linear motion mechanism.

Figure 6:
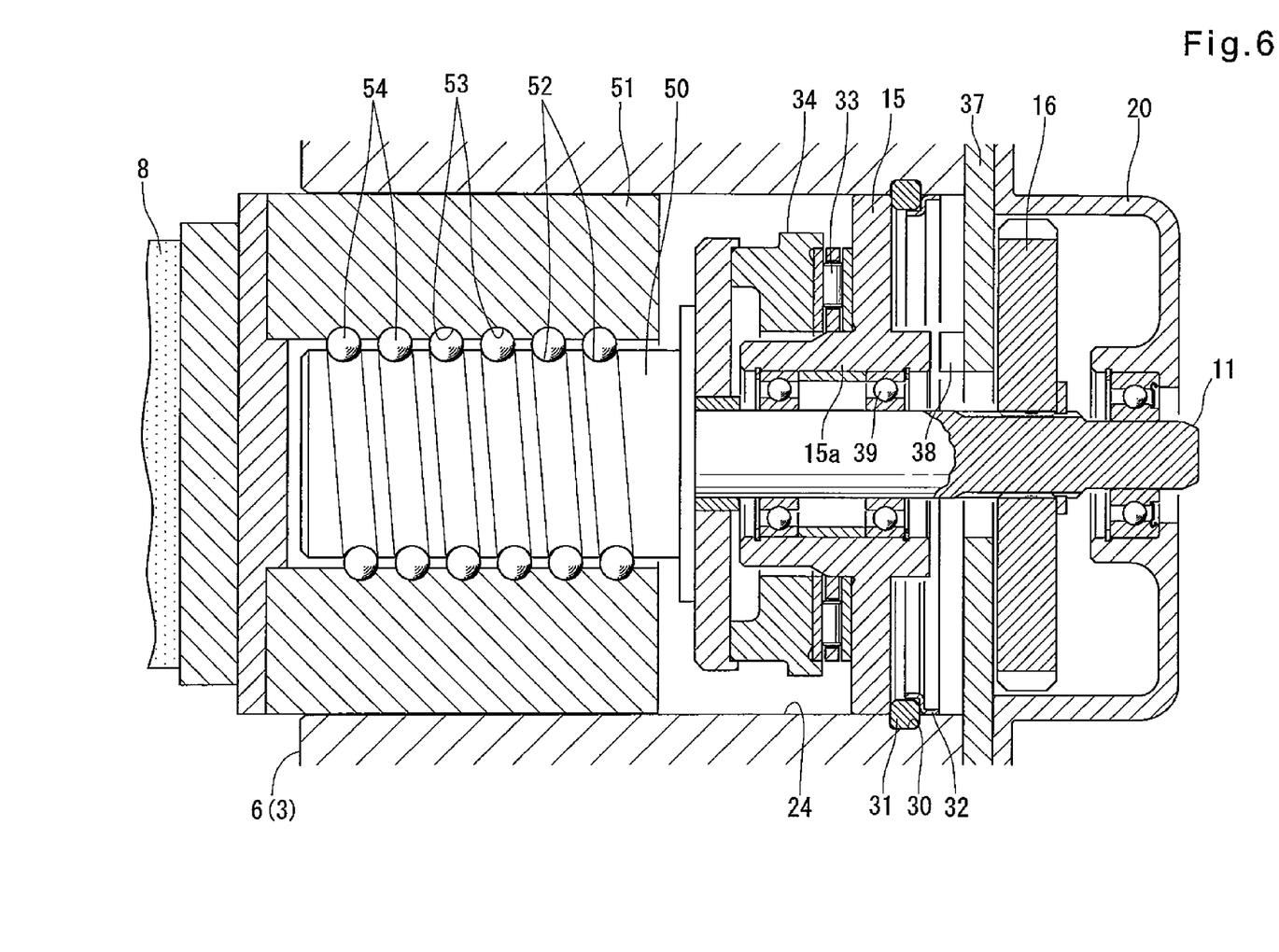
FIG. 6 is an enlarged sectional view of an electric brake system which includes a linear motion mechanism in the form of a ball-screw mechanism.

By way of example, FIG. 6 shows an electric brake system including a ball-screw mechanism as the linear motion mechanism. In the following description, elements corresponding to those of the above embodiment are denoted by identical numerals and their description is omitted.

In FIG. 6, the electric linear motion actuator includes a rotary shaft 11, a threaded shaft 50 integral with the rotary shaft 11, a nut 51 surrounding the threaded shaft 50, a plurality of balls 54 mounted between a thread groove 52 formed in the outer periphery of the threaded shaft 50 and a thread groove 53 formed in the inner periphery of the nut 51, a return tube, not shown, through which the balls 54 are returned from the terminal point to the starting point, of the thread groove 53 of the nut 51, and a reaction force receiving member 15 provided axially rearwardly of the nut 51.

The nut 51 is received in a receiving hole 24 formed in the opposed piece 3 of the caliper body 6 so as to be rotationally fixed but axially slidable relative to the caliper body 6. A spacer 34 is provided at the axially rear end of the threaded shaft 50 so as to rotate in unison with the threaded shaft 50. The spacer 34 is supported by the reaction force receiving member 15 through a thrust bearing 33. The reaction force receiving member 15 axially supports the nut 51 through the spacer 34, the thrust bearing 33 and the threaded shaft 50, thereby restraining axially rearward movement of the nut 51.

With this electric linear motion actuator, the nut 51 is moved axially forward by rotating the rotary shaft 11, thus rotating the threaded shaft 50 and the nut 51 relative to each other. When the nut 51 is moved axially forward, an axially rearward reaction force is applied to the threaded shaft 50. This reaction force is transmitted to the reaction force receiving member 15 through the spacer 34 and the thrust bearing 33 and received by the reaction force receiving member 15. Under this reaction force, the reaction force receiving member 15 is axially displaced, and the axial displacement of the member 15 is measured by the displacement sensor 38. Thus, based on the output signal of the displacement sensor 38, it is possible to detect the pressing force of the friction pad 8.

Figure 7:
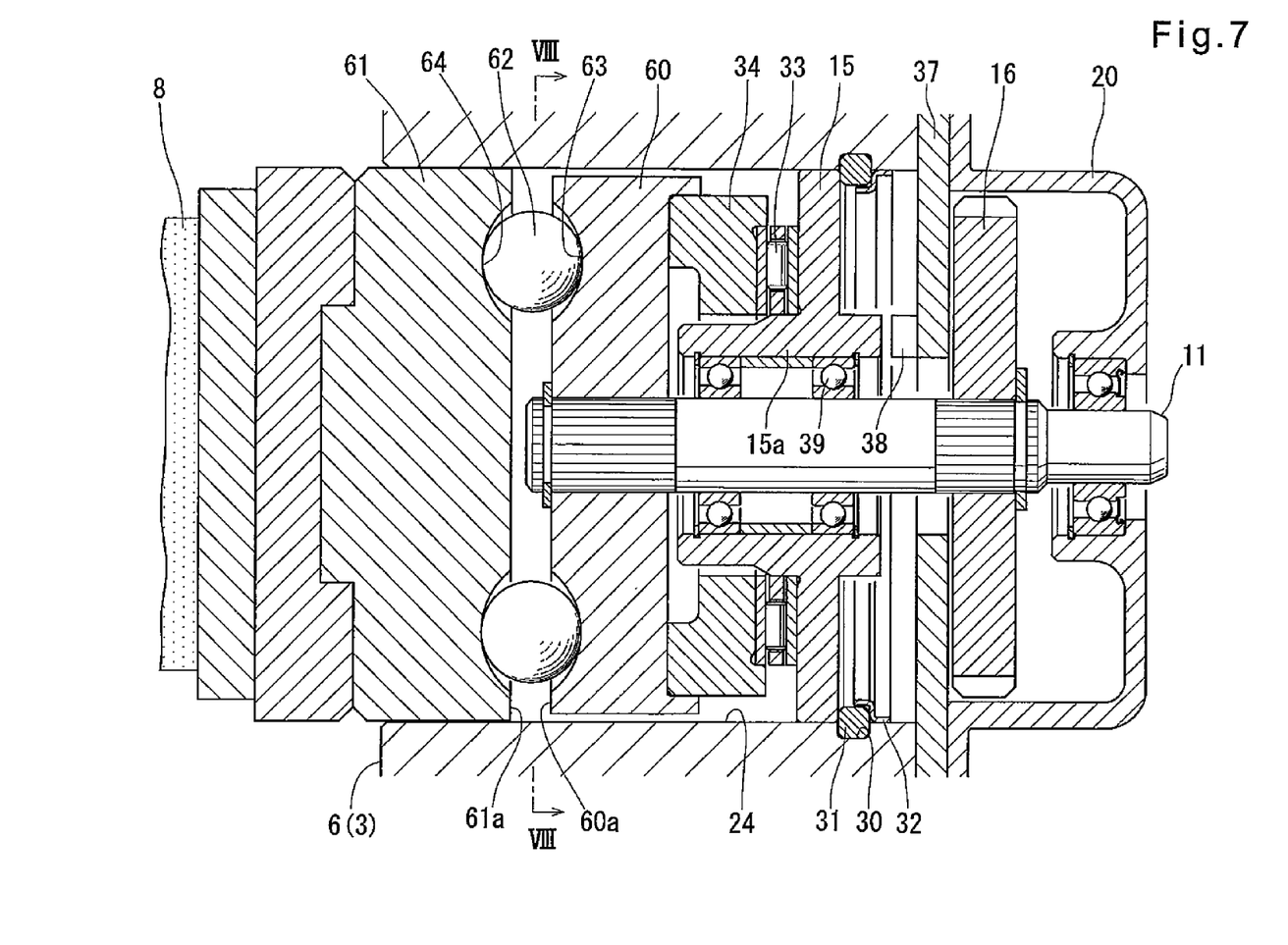
FIG. 7 is an enlarged sectional view of an electric brake system which includes a linear motion mechanism in the form of a ball-ramp mechanism.

FIG. 7 shows an electric brake system including a ball-ramp mechanism as the linear motion mechanism.

In FIG. 7, the electric linear motion actuator includes a rotary shaft 11, a rotary disk 60 rotationally fixed to the outer periphery of the rotary shaft 11, a linear motion disk 61 located axially forwardly of, and axially facing, the rotary disk 60, a plurality of balls 62 disposed between the rotary disk 60 and the linear motion disk 61, and a reaction force receiving member 15 positioned axially rearwardly of the linear motion disk 61.

The linear motion disk 61 is received in a receiving hole 24 formed in the opposed piece 3 of the caliper body 6 so as to be rotationally fixed but axially slidable relative to the caliper body 6. A spacer 34 is provided at the axially rear end of the rotary disk 60 so as to be rotatable in unison with the rotary disk 60. The spacer 34 is supported by the reaction force receiving member 15 through a thrust bearing 33. The reaction force receiving member 15 axially supports the rotary disk 60 through the spacer 34 and the thrust bearing 33, thus restraining axially rearward movement of the rotary disk 60.

Figure 8:
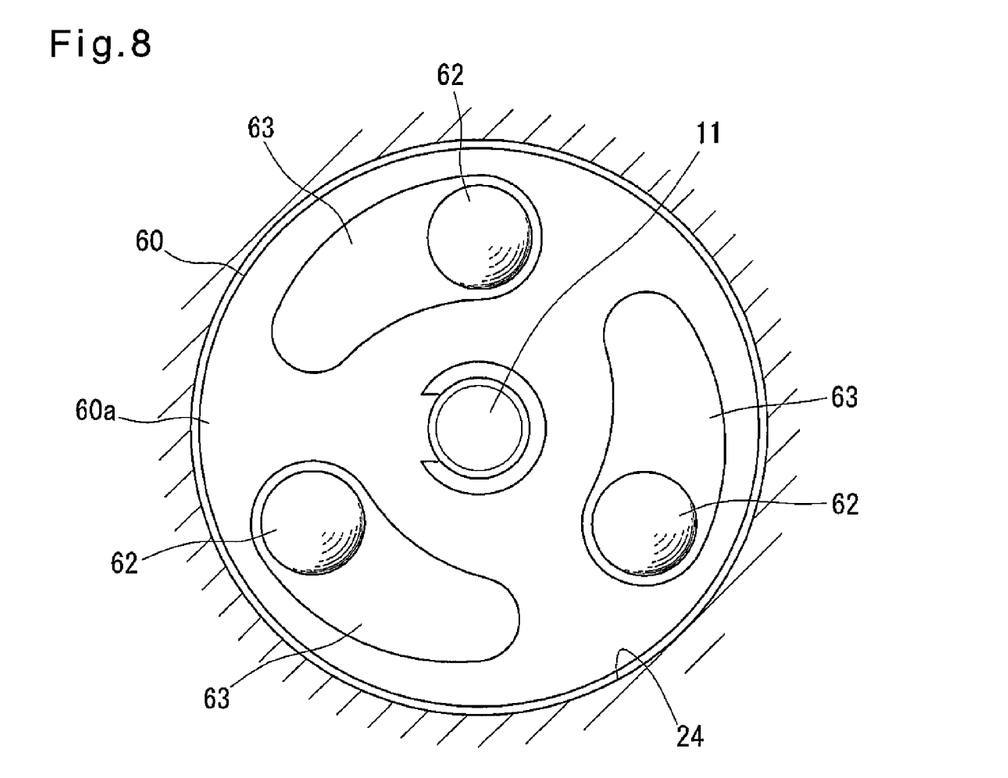
FIG. 8 is a sectional view taken along line VIII-VIII of FIG. 7.
Figures 9A, 9B:
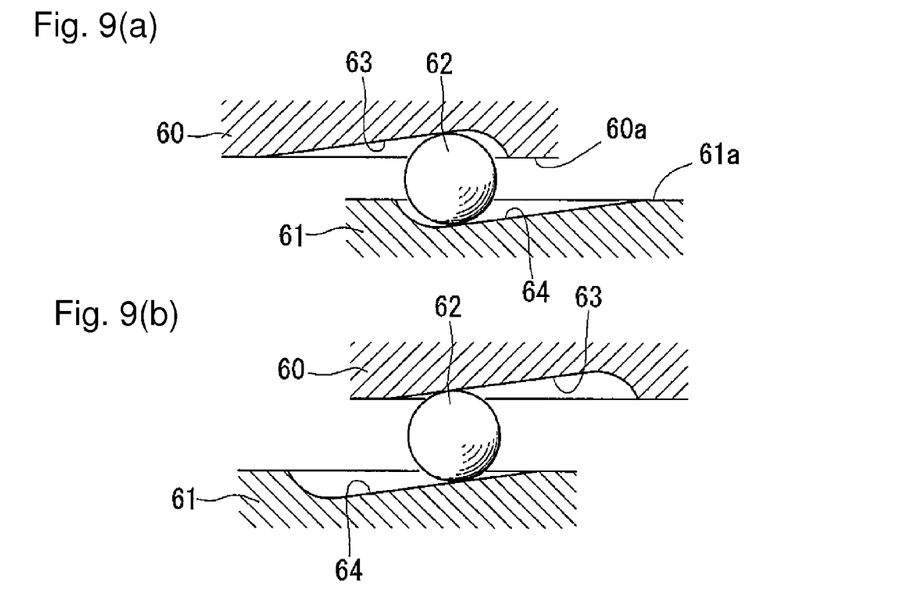
FIG. 9(a) shows the relationship between a ball and inclined grooves shown in FIG. 7.
FIG. 9(b) shows the state in which the distance between a rotary disk and a linear motion disk has increased as a result of relative rotation between the disks.

As shown in FIGS. 7 and 8, the surface 60a of the rotary disk 60 facing the linear motion disk 61 is formed with inclined grooves 63 of which the depth gradually decreases in one circumferential direction, while the surface 61a of the linear motion disk 61 facing the rotary disk 60 is formed with inclined grooves 64 of which the depth gradually decreases in the opposite circumferential direction. As shown in FIG. 9(a), the balls 62 are received between the respective inclined grooves 63 of the rotary disk 60 and the corresponding inclined grooves 64 of the linear motion disk 61. As shown in FIG. 9(b), when the rotary disk 60 rotates relative to the linear motion disk 61, the balls 62 roll in the respective pairs of inclined grooves 63 and 64 such that the distance between the rotary disk 60 and the linear motion disk 61 increases.

With this electric linear motion actuator, when the rotary shaft 11 is rotated, the linear motion disk 61 and the rotary disk 60 rotate relative to each other such that the linear motion disk 61 is moved axially forwardly. When the disk 61 is moved forwardly, an axially rearward reaction force acts on the rotary disk 60. This reaction force is transmitted to the reaction force receiving member 15 through the spacer 34 and the thrust bearing 33, and received by the reaction force receiving member 15. Under this reaction force, the reaction force receiving member 15 is deformed in the axial direction. The displacement sensor 38 measures the axial displacement of the reaction force receiving member 15 due to the axial deformation of the member 15. Thus, it is possible to detect the pressing force of the friction pad 8 based on the output signal of the displacement sensor 38.

Figure 10:
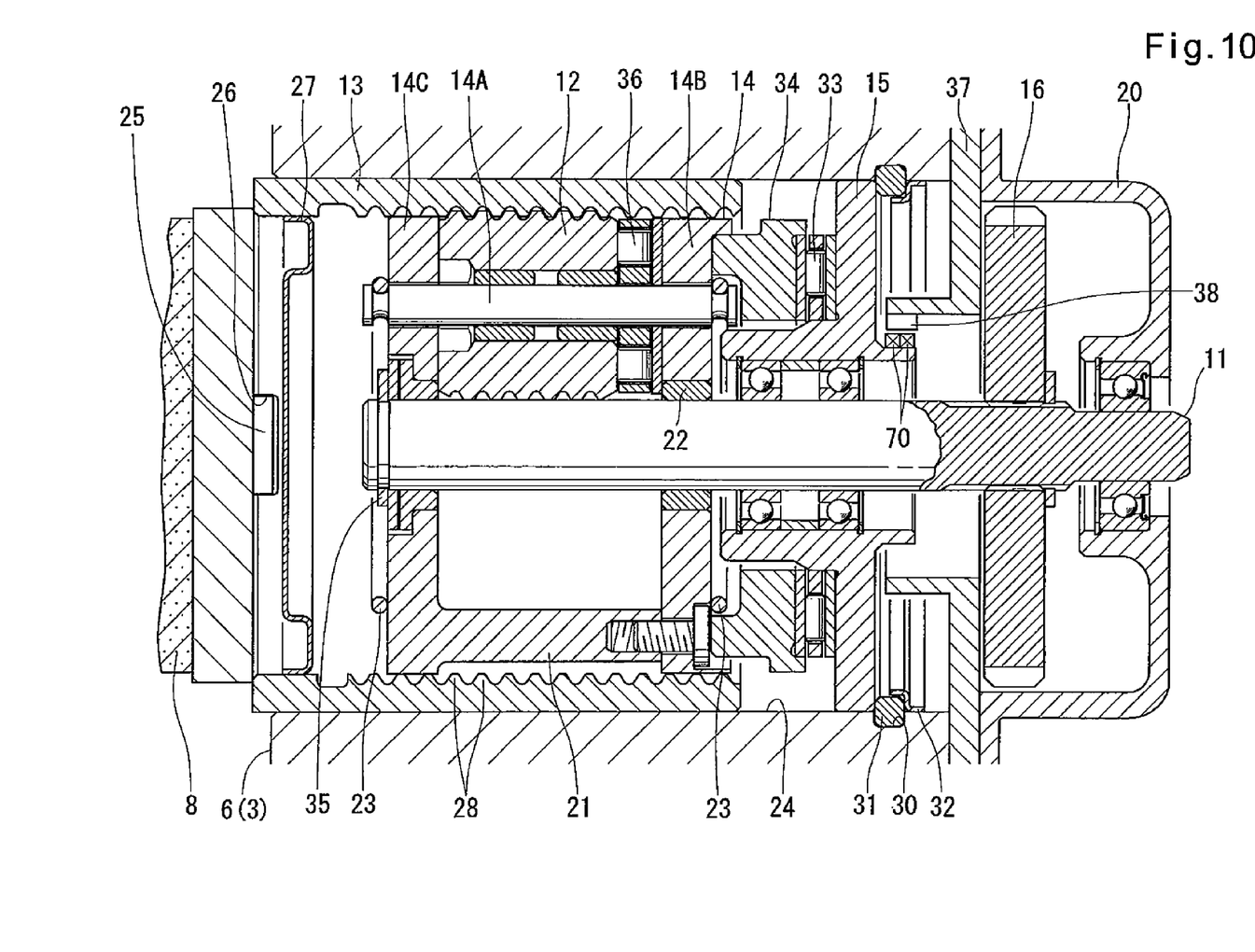
FIG. 10 shows a displacement sensor which is different from the one shown in FIG. 3.
Figure 11:
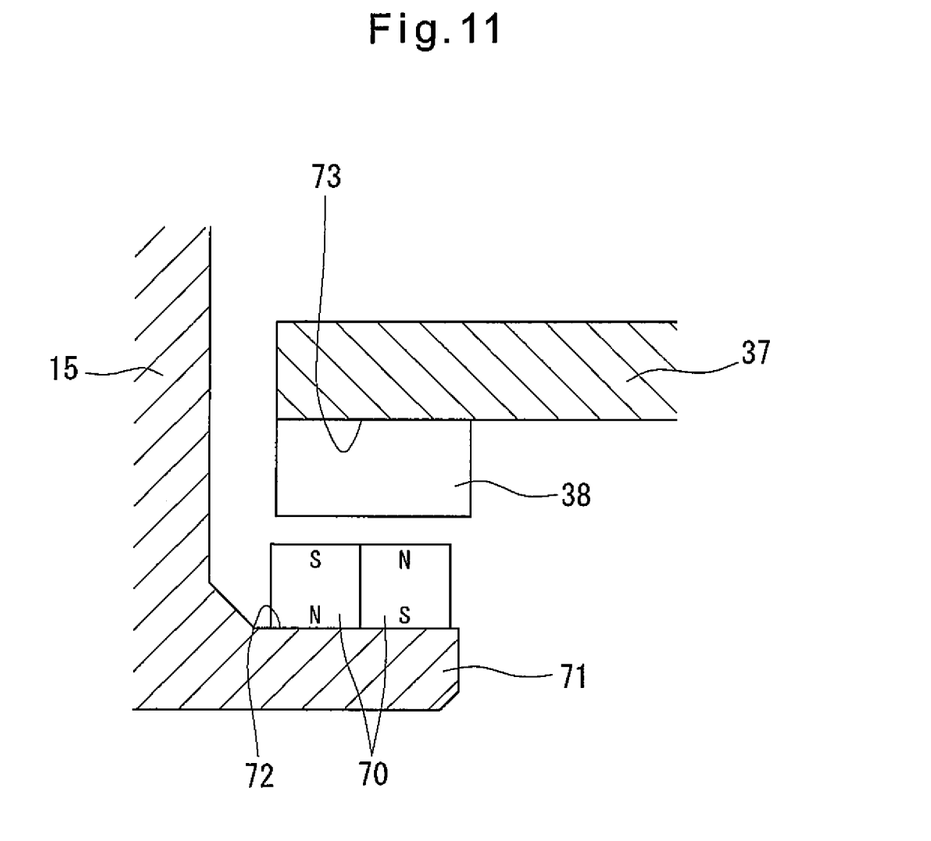
FIG. 11 is an enlarged sectional view of a portion of FIG. 10 where there is the displacement sensor.

If a magnetic sensor is used as the displacement sensor 38, as shown in FIGS. 10 and 11, two permanent magnets 70 may be fixed to the reaction force receiving member 15 which are magnetized in the direction perpendicular to the axial direction such that the north and south poles of one of the magnets 70 axially face the south and north poles of the other magnet 70, respectively, and positioned such that the displacement sensor 38 is located in the vicinity of the boundary between the axially adjacent north and south poles of the respective magnets 70. With this arrangement, the output signal of the displacement sensor 38 changes sharply only when the reaction force receiving member 60 is displaced in the axial direction, and scarcely changes for displacement of the reaction force receiving member in a direction other than the axial direction. Thus, it is possible to detect the pressing force of the friction pad 8 with high accuracy in a stable manner, practically without the influence of external vibrations.

As shown in FIG. 11, the permanent magnets 70 are fixed on the radially outer surface 72 of a tubular portion 71 axially rearwardly extending from the radially inner portion of the reaction force receiving member 15, which is an annular plate member. The sensor mounting plate 37 has a radially inner surface 73 radially facing the radially outer surface 72 of the tubular portion 71. The displacement sensor 38 is fixed on this radially inner surface 73.

What is claimed is:

1. An electric brake system comprising: a rotary shaft driven by an electric motor; a linear motion mechanism, including a linear motion member, for converting a rotary motion of the rotary shaft to a linear motion of the linear motion member; a caliper body formed with a receiving hole in which the linear motion member is axially slidably received; a friction pad arranged at an axial front end of the linear motion member and configured to be pressed against a brake disk by the linear motion member; a reaction force receiving member provided axially rearwardly of the linear motion member for receiving an axially rearward reaction force applied to the linear motion member when the friction pad is pressed by the linear motion member; a displacement sensor for detecting a pressing force to the friction pad by measuring a displacement of the reaction force receiving member; and a snap ring fitted in a circumferential groove formed in an inner wall of the receiving hole at a portion of the inner wall located axially rearwardly of an area of the inner wall where the linear motion member slides, the snap ring restraining axially rearward movement of the reaction force receiving member.

2. The electric brake system of claim 1, further comprising an elastic member disposed between the snap ring and the reaction force receiving member.

3. The electric brake system of claim 2, wherein the elastic member comprises an annular metal member having an L-shaped section and having a portion located radially inwardly of a radially inner periphery of the snap ring and in abutment with the reaction force receiving member.

4. The electric brake system of claim 1, wherein the displacement sensor comprises an optical sensor.

5. The electric brake system of claim 4, further comprising a soft member covering a space between the optical sensor and the reaction force receiving member, the soft member being deformable as the reaction force receiving member is displaced.

6. The electric brake system of claim 1, wherein the reaction force receiving member has a radially innermost portion, and wherein the displacement sensor is mounted such that the displacement sensor can measure an axial displacement of the radially innermost portion.

7. The electric brake system of claim 1, further comprising a ring-shaped sensor mounting plate fixedly positioned axially rearwardly of the reaction force receiving member such that the rotary shaft extends through the sensor mounting plate, wherein the displacement sensor is mounted on the sensor mounting plate.

8. The electric brake system of claim 1, wherein the displacement sensor comprises one of a magnetic sensor, an eddy current sensor and an electrical capacitance sensor.

9. The electric brake system of claim 1, further comprising at least two permanent magnets magnetized in a direction perpendicular to the axial direction, and fixed to the reaction force receiving member such that the north pole and the south pole of the respective permanent magnets are located axially adjacent to each other, wherein the displacement sensor comprises a magnetic sensor located in a vicinity of a boundary between said axially adjacent north pole and south pole.

10. The electric brake system of claim 1, wherein the linear motion mechanism comprises: a plurality of planetary rollers kept in rolling contact with a radially outer surface of the rotary shaft; a carrier retaining the planetary rollers such that the planetary rollers can rotate about axes of the respective planetary rollers and can revolve around the rotary shaft, the carrier being restrained from axial movement; and an outer ring member surrounding the planetary rollers and constituting the linear motion member; wherein the outer ring member has a helical rib formed on a radially inner surface of the outer ring member; wherein each of the planetary rollers has a helical groove or circumferential grooves formed in a radially outer surface of the planetary roller; and wherein the helical rib is engaged in the helical grooves or the circumferential grooves.

11. An electric brake system comprising: a rotary shaft driven by an electric motor; a linear motion mechanism, including a linear motion member, for converting a rotary motion of the rotary shaft to a linear motion of the linear motion member; a caliper body formed with a receiving hole in which the linear motion member is axially slidably received; a friction pad arranged at an axial front end of the linear motion member and configured to be pressed against a brake disk by the linear motion member; a reaction force receiving member provided axially rearwardly of the linear motion member for receiving an axially rearward reaction force applied to the linear motion member when the friction pad is pressed by the linear motion member; a displacement sensor for measuring an axial displacement of the reaction force receiving member; and a snap ring fitted in a circumferential groove formed in an inner wall of the receiving hole at a portion of the inner wall located axially rearwardly of an area of the inner wall where the linear motion member slides, the snap ring restraining axially rearward movement of the reaction force receiving member.

12. The electric brake system of claim 11, wherein the reaction force receiving member has a radially innermost portion, and wherein the displacement sensor is mounted such that the displacement sensor can measure an axial displacement of the radially innermost portion.

13. The electric brake system of claim 11, further comprising a ring-shaped sensor mounting plate fixedly positioned axially rearwardly of the reaction force receiving member such that the rotary shaft extends through the sensor mounting plate, wherein the displacement sensor is mounted on the sensor mounting plate.

14. The electric brake system of claim 11, wherein the displacement sensor comprises an optical sensor.

15. The electric brake system of claim 11, wherein the displacement sensor comprises one of a magnetic sensor, an eddy current sensor and an electrical capacitance sensor.

16. The electric brake system of claim 11, further comprising at least two permanent magnets magnetized in a direction perpendicular to the axial direction, and fixed to the reaction force receiving member such that the north pole and the south pole of the respective permanent magnets are located axially adjacent to each other, wherein the displacement sensor comprises a magnetic sensor located in a vicinity of a boundary between said axially adjacent north pole and south pole.

17. The electric brake system of claim 11, wherein the linear motion mechanism comprises: a plurality of planetary rollers kept in rolling contact with a radially outer surface of the rotary shaft; a carrier retaining the planetary rollers such that the planetary rollers can rotate about axes of the respective planetary rollers and can revolve around the rotary shaft, the carrier being restrained from axial movement; and an outer ring member surrounding the planetary rollers and constituting the linear motion member; wherein the outer ring member has a helical rib formed on a radially inner surface of the outer ring member; wherein each of the planetary rollers has a helical groove or circumferential grooves formed in a radially outer surface of the planetary roller; and wherein the helical rib is engaged in the helical grooves or the circumferential grooves.

18. An electric brake system comprising: a rotary shaft driven by an electric motor; a linear motion mechanism, including a linear motion member, for converting a rotary motion of the rotary shaft to a linear motion of the linear motion member; a caliper body formed with a receiving hole in which the linear motion member is axially slidably received; a friction pad arranged at an axial front end of the linear motion member and configured to be pressed against a brake disk by the linear motion member; a reaction force receiving member provided axially rearwardly of the linear motion member for receiving an axially rearward reaction force applied to the linear motion member when the friction pad is pressed by the linear motion member; and a displacement sensor for measuring a displacement of the reaction force receiving member; wherein the linear motion mechanism comprises a plurality of planetary rollers kept in rolling contact with a radially outer surface of the rotary shaft, a carrier retaining the planetary rollers such that the planetary rollers can rotate about axes of the respective planetary rollers and can revolve around the rotary shaft, the carrier being restrained from axial movement, and an outer ring member surrounding the planetary rollers and constituting the linear motion member, wherein the outer ring member has a helical rib formed on a radially inner surface of the outer ring member, wherein each of the planetary rollers has a helical groove or circumferential grooves formed in a radially outer surface of the planetary roller, and wherein the helical rib is engaged in the helical grooves or the circumferential grooves.

* * * * *